UNITED STATES PATENT OFFICE.

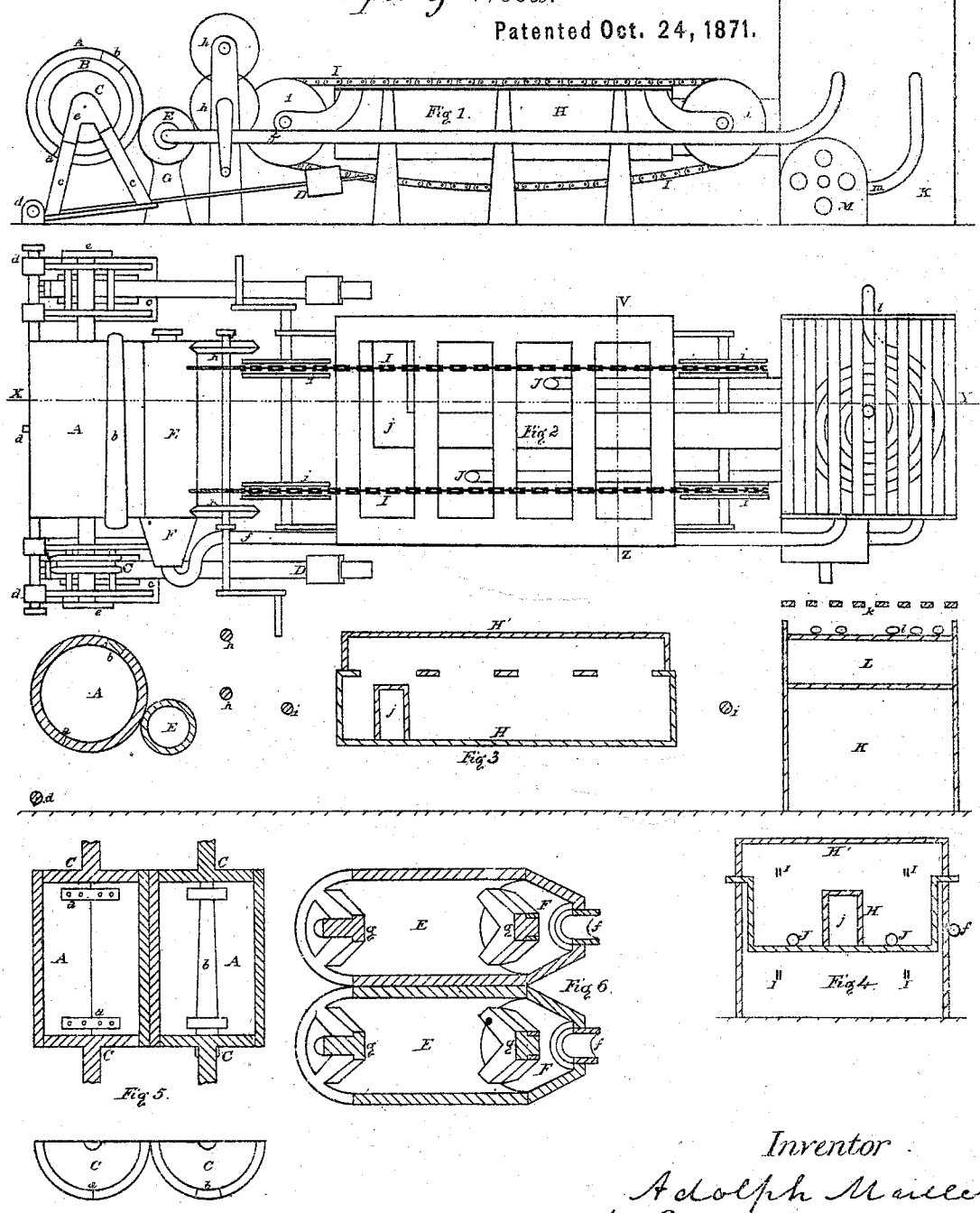

ADOLPH MÜLLER, OF BROOKLYN, NEW YORK.

IMPROVEMENT IN THE MANUFACTURE OF WOODEN PIPES FROM VENEERS.

Specification forming part of Letters Patent No. 120,210, dated October 24, 1871.

*To all whom it may concern:*

Be it known that I, ADOLPH MÜLLER, of Brooklyn, county of Kings and State of New York, have invented a new and useful Improvement in Machinery for Manufacturing Pipes and other Structures of Wood; and that the following is a full, clear, and exact description thereof, reference being had to the accompanying drawing forming a part of this specification.

In the machinery and process heretofore in use for the purpose, after the several layers of thin boards or veneers, with the necessary intervening substances, such as glue, bitumen, pitch, tar, asphaltum, or other suitable or similar materials, have been wound around the mandrel until the required thickness has been obtained, a former or matrix has to be placed around it, securely locked, and the mandrel expanded by wedging until the structure is forced firmly against the wall of the former or matrix. During this latter operation no provision is made to maintain sufficient heat to keep the materials in a sufficiently fused or semi-fluid condition. Another defect is that as the ends of the pipe or structure require trimming at their ends, which can only be done in the foregoing case after the removal from the former or matrix, the materials will have become so hard that the cutting will be very difficult and expensive, while, if the ends are cut during the winding process, the materials being soft, there is not the least difficulty.

It is, therefore, the object of this invention to overcome these and other defects in the present process; and it consists: first, in winding the prepared layers of thin boards or veneers firmly and compactly around a suitable mandrel so that, as soon as the required thickness is obtained, the pipe or other structure will be complete without the use or application of an outside former or matrix; second, in keeping the materials in a fused state until the pipe or structure is completed; and third, trimming the ends during the process of winding, while the materials are soft and easily cut.

In the drawing, Figure 1 represents a side elevation. Fig. 2 represents a plan; Fig. 3, a longitudinal section on $x\,y$ of Fig. 2; Fig. 4, a transverse section on $v\,z$ of Fig. 2; Fig. 5, a diametric longitudinal section and a projected view of end and inner parts of the mandrel; Fig. 6, a diametric longitudinal section and perspective view of the hot-air roller and its truncated mouth-piece.

In the several figures, A indicates the mandrel; B, its movable ends or heads; $a$, its hinge; $b$, its wedge; C, the pulley on its shaft; $c\,c$, its support or frame; D, the levers and weights of frame; $d$, the hinges of frame; $e$, clasps over ends of shaft; E, hot-air roller; F, its truncated mouth-piece; G, its supports; $f$, its feed-pipe; $g$, gudgeons; $h\,h$, circular cutters; H, heating-trough; H', cover to heating-trough; I I, endless chain; $i\,i$, its pulleys; J J, hot-air pipes; $j$, smoke-pipe; $k$, furnace; L, hot-air chamber; K, grate above hot-air chamber; $l$, its hot-air feed-pipe; M, blower; $m$, its air-pipe.

The operation is as follows: The materials are heated and thoroughly melted by placing the same on the bars over the chamber of the furnace, into which hot air is forced by the action of the blowers or other suitable well-known means. The melted materials flow into a shallow bath or pan of the required capacity to receive the thin boards or veneers, which are submerged in the melted or liquefied materials in said bath or pan for a sufficient length of time to allow them to thoroughly saturate and permeate the wood. The thin boards or veneers thus permeated and saturated are then taken out and passed between pressure-rollers, and laid upon the endless chain passing over the bed in layers until the required thickness is obtained. In laying them on the chain and bed they should be so placed that the grain of the wood in one layer shall be at right angles, or as nearly so as practicable, to the grain of the other layer, and so on alternately. As they are to be carried to the mandrel by the endless chain, of course the first layer must be at right angles to the direction of the bed. In cases where it is desired to produce bevels at the ends of the pipes or structure when completed each subsequent layer must overlap the other longitudinally to the extent necessary to produce the required bevel; and should it be desirable to form the sections of the pipe so that they may be connected without a collar or sleeve or other connecting appliances, one end of one section may be made to enter into one end of the other by laying the boards or veneers on the bed so that each layer shall extend over the previous one on one side and recede correspondingly on the other side; then, by putting a bevel-collar on one end of the mandrel opposite to that from which the structure is to be removed, the required bevel will be produced at one end in the inside and at the other on the outside. In laying the boards or veneers on the bed they should also overlap at one end and recede at the other, so that, when wound round the mandrel and finished, as little irregularity in either the inner or outer surfaces of the pipe or structure as possible will appear. Underneath the bed is a trough, through which the smoke-pipe is carried, for the purpose of economy of heat. Hot-air pipes from the furnace also extend into the trough, as shown in the drawing; and after the requisite layers of boards or veneers are in place a cover is placed over the bed so as to retain the heat. An air-pipe also extends from the furnace to the hollow hot-air roller E, through the truncated mouth-piece F of which the hot air enters it. Between the forward end of the bed and the hot-air roller and mandrel are four rotating cutters, two at each side of the bed, arranged on shafts. These cut or trim the edges of the materials as they are being carried by the chains to the roller and mandrel. The mandrel is hollow, has a spring-hinge at one side and a wedge at the other to increase or decrease its circumference. The thin boards or veneers having been treated as before described and laid on the bed, the mandrel extended to the required dimension, and the requisite degree of heat obtained in the trough and hot-air roller, the machinery is put in operation and the materials wound around the mandrel. During the operation the mandrel, which operates in a hinged frame, as shown, is forced, to any extent desired, toward the roller by the levers and weights D. As there is necessarily some space between the end of the bed and the mandrel, and the prepared wood very soft and pliable, and would drop down at the end of the bed if there was no support, slight cords are secured to the mandrel near each end and carried back and connected to the endless chain at each side of the bed, a sufficient distance for such support until one turn has been wound round the mandrel, when, being of no further use, they break, and the chains and mandrel complete the carrying and winding. When the pipe or structure is finished the force of the levers is released and the mandrel thrown back from contact with the heated roller and removed from its shaft, and the materials allowed to cool. Then the wedge $b$ of the mandrel is driven out and the pipe or structure is easily removed.

What I claim as my invention, and desire to secure by Letters Patent, is—

1. The combination and arrangement of the mandrel and hot-air roller, constructed and operated substantially as and for the purpose set forth, with a suitable bed on which to place and arrange the prepared wood and move the same to the action of the mandrel and roller.

2. The combination of the mandrel and hot-air roller, as aforesaid, with a bed and endless chain-feed.

3. The combination of mandrel, hot-air roller, a bed with a trough and heating appliances, and feeding or carrying device, substantially as shown and for the purpose stated.

4. The cutters, constructed and operating substantially as shown and described, in combination with the bed, mandrel, and roller.

5. The combination of a bed, feeding device, cutters, mandrel, and roller, substantially as and for the purpose described.

6. In combination with the parts last aforesaid, the furnace, hot-air chamber, pipes, and bars, all arranged and operating substantially as shown, and for the purpose set forth.

7. Providing one end of the mandrel with a bevel or beveled collar, substantially as and for the purpose specified.

June 23, 1871.

ADOLPH MÜLLER.

Witnesses:
THOMAS VAN ANTWERP,
ANDREW VAN ANTWERP.

(167)